US012529607B2

(12) United States Patent
Finnegan et al.

(10) Patent No.: US 12,529,607 B2
(45) Date of Patent: Jan. 20, 2026

(54) PROBE DEVICES WITH TEMPERATURE SENSORS AND RELATED SYSTEMS AND METHODS

(71) Applicant: NeuroOne Medical Technologies Corporation, Eden Prairie, MN (US)

(72) Inventors: Christopher Blake Finnegan, Los Gatos, CA (US); Camilo Diaz-Botia, Monte Sereno, CA (US); Dave Rosa, Eden Prairie, MN (US); Steve Mertens, Plymouth, MN (US)

(73) Assignee: NeuroOne Medical Technologies Corporation, Eden Prairie, MN (US)

( * ) Notice: Subject to any disclaimer, the term of this patent is extended or adjusted under 35 U.S.C. 154(b) by 568 days.

(21) Appl. No.: 17/860,232

(22) Filed: Jul. 8, 2022

(65) Prior Publication Data

US 2023/0008062 A1 Jan. 12, 2023

Related U.S. Application Data

(60) Provisional application No. 63/219,558, filed on Jul. 8, 2021.

(51) Int. Cl.
*G01K 7/22* (2006.01)
*A61N 1/05* (2006.01)

(52) U.S. Cl.
CPC .............. *G01K 7/22* (2013.01); *A61N 1/0551* (2013.01)

(58) Field of Classification Search
CPC ................................ G01K 7/22; A61N 1/0551
See application file for complete search history.

(56) References Cited

U.S. PATENT DOCUMENTS

| 3,324,855 | A | | 6/1967 | Heimlich | |
|---|---|---|---|---|---|
| 4,158,916 | A | | 6/1979 | Adler | |
| 4,946,457 | A | | 8/1990 | Elliott | |
| 5,606,974 | A | * | 3/1997 | Castellano | A61B 17/2202 600/438 |
| 5,904,711 | A | | 5/1999 | Flom et al. | |
| 5,916,213 | A | * | 6/1999 | Haissaguerre | A61B 18/1492 606/41 |
| 5,991,650 | A | * | 11/1999 | Swanson | A61L 31/145 606/41 |
| 6,205,361 | B1 | | 3/2001 | Kuzma et al. | |

(Continued)

FOREIGN PATENT DOCUMENTS

| EP | 1870127 A1 | | 12/2007 |
|---|---|---|---|
| JP | 2003500099 A | * | 1/2003 |

(Continued)

OTHER PUBLICATIONS

17860232_2024-10-28_JP_2003500099_A_H.pdf,Jan. 7, 2003.*

(Continued)

*Primary Examiner* — Laura Martin
(74) *Attorney, Agent, or Firm* — Fredrikson & Byron, P.A.

(57) ABSTRACT

Electrode devices are provided having certain thin film components, including at least one thin film contact and a temperature sensor associated with the contact. The temperature sensor can be used to monitor the temperature during use of the electrode device, including during electrical stimulation or ablation. Further, the temperature sensor can be used to identify the most effective temperature for stimulation or ablation.

18 Claims, 3 Drawing Sheets

(56) References Cited

U.S. PATENT DOCUMENTS

| | | |
|---|---|---|
| 6,415,187 B1 | 7/2002 | Kuzma et al. |
| 7,337,012 B2 | 2/2008 | Maghribi et al. |
| 7,387,626 B2 | 6/2008 | Edwards et al. |
| 7,611,455 B2 | 11/2009 | Borst et al. |
| 8,021,362 B2 | 9/2011 | Deem et al. |
| 8,229,539 B1 | 7/2012 | Motoyoshi et al. |
| 8,781,600 B2 | 7/2014 | Janik et al. |
| 8,798,769 B1 | 8/2014 | Parker, Jr. |
| 9,006,014 B2 | 4/2015 | Mujeeb-U-Rahman et al. |
| 9,020,608 B2 | 4/2015 | Swanson |
| 9,314,618 B2 * | 4/2016 | Imran .................... H05K 1/118 |
| 9,485,873 B2 | 11/2016 | Shah et al. |
| 9,498,617 B2 | 11/2016 | Shah et al. |
| 9,788,432 B2 | 10/2017 | Greenberg et al. |
| 10,118,030 B2 | 11/2018 | Pellinen et al. |
| 10,245,178 B1 | 4/2019 | Heitzmann et al. |
| 2001/0011161 A1 | 8/2001 | Edwards et al. |
| 2003/0078633 A1 | 4/2003 | Firlik et al. |
| 2003/0124484 A1 | 7/2003 | Reiz |
| 2003/0190608 A1 | 10/2003 | Blackburn |
| 2004/0043479 A1 | 3/2004 | Tuggle et al. |
| 2004/0186543 A1 | 9/2004 | King et al. |
| 2005/0033286 A1 | 2/2005 | Eggers et al. |
| 2005/0261673 A1 | 11/2005 | Bonner et al. |
| 2006/0067649 A1 | 3/2006 | Tung et al. |
| 2006/0129203 A1 | 6/2006 | Garabedian et al. |
| 2006/0252014 A1 | 11/2006 | Simon et al. |
| 2007/0073357 A1 | 3/2007 | Rooney et al. |
| 2007/0088417 A1 | 4/2007 | Schouenborg |
| 2007/0197892 A1 | 8/2007 | Shen et al. |
| 2007/0287991 A1 | 12/2007 | Mckay et al. |
| 2008/0039917 A1 | 2/2008 | Cross et al. |
| 2008/0312716 A1 | 12/2008 | Russell |
| 2009/0234426 A1 | 9/2009 | Pellinen et al. |
| 2010/0114348 A1 | 5/2010 | Boyden et al. |
| 2010/0152880 A1 | 6/2010 | Boyden et al. |
| 2011/0034977 A1 | 2/2011 | Janik et al. |
| 2011/0077660 A1 | 3/2011 | Janik et al. |
| 2011/0130708 A1 | 6/2011 | Perry et al. |
| 2011/0130805 A1 | 6/2011 | Goel |
| 2011/0224682 A1 | 9/2011 | Westlund et al. |
| 2012/0143296 A1 | 6/2012 | Pianca et al. |
| 2013/0005169 A1 | 1/2013 | Soltis et al. |
| 2013/0011332 A1 | 1/2013 | Boyden et al. |
| 2013/0035574 A1 | 2/2013 | Anand |
| 2013/0035660 A1 | 2/2013 | Anand |
| 2013/0041445 A1 | 2/2013 | Erickson et al. |
| 2013/0110210 A1 | 5/2013 | North |
| 2013/0123775 A1 | 5/2013 | Grunewald et al. |
| 2013/0165990 A1 * | 6/2013 | Mathur .................... A61N 1/06 607/101 |
| 2013/0238077 A1 | 9/2013 | Feler |
| 2013/0289684 A1 | 10/2013 | North et al. |
| 2013/0310823 A1 | 11/2013 | Gelfand et al. |
| 2013/0312258 A1 | 11/2013 | Swanson |
| 2014/0200511 A1 | 7/2014 | Boyden et al. |
| 2014/0277317 A1 | 9/2014 | Tooker et al. |
| 2014/0324117 A1 | 10/2014 | Bedenbaugh |
| 2015/0032194 A1 * | 1/2015 | Mergen .................... C23C 14/34 607/137 |
| 2015/0045810 A1 | 2/2015 | Hoffer et al. |
| 2015/0066105 A1 | 3/2015 | Elborno |
| 2015/0066122 A1 | 3/2015 | Govea |
| 2015/0094734 A1 | 4/2015 | Staunton et al. |
| 2016/0000499 A1 | 1/2016 | Lennox et al. |
| 2016/0038940 A1 | 2/2016 | Babcock |
| 2016/0144189 A1 | 5/2016 | Bakker et al. |
| 2017/0007813 A1 | 1/2017 | Negi et al. |
| 2017/0173262 A1 | 6/2017 | Veltz |
| 2017/0245772 A1 | 8/2017 | Bierbrauer et al. |
| 2017/0246450 A1 | 8/2017 | Liu et al. |
| 2017/0340891 A1 | 11/2017 | Boggs et al. |
| 2018/0008821 A1 | 1/2018 | Gonzalez et al. |
| 2018/0117313 A1 | 5/2018 | Schmidt et al. |
| 2018/0126156 A1 | 5/2018 | Sparks et al. |
| 2018/0289949 A1 | 10/2018 | Bachinski et al. |
| 2018/0333571 A1 | 11/2018 | Pepin et al. |
| 2019/0336771 A1 | 11/2019 | Voit et al. |
| 2020/0008299 A1 | 1/2020 | Tran et al. |
| 2020/0030024 A1 | 1/2020 | Rao et al. |
| 2020/0091495 A1 | 3/2020 | Ghezzi et al. |
| 2020/0107743 A1 | 4/2020 | Bachinski et al. |
| 2020/0281489 A1 | 9/2020 | Rosa et al. |
| 2020/0391027 A1 | 12/2020 | Thakkar et al. |
| 2021/0008364 A1 | 1/2021 | Chen et al. |
| 2021/0046305 A1 | 2/2021 | Rosa et al. |
| 2021/0101010 A1 | 4/2021 | Howard et al. |

FOREIGN PATENT DOCUMENTS

| | | | |
|---|---|---|---|
| WO | WO-2014113612 A1 * | 7/2014 | ......... A61B 18/1492 |
| WO | 2021021886 A1 | 2/2021 | |

OTHER PUBLICATIONS

17860232_2024-10-28_WO_2014113612_A1_H.pdf,Jul. 24, 2014.*

European Patent Office, "Extended European Search Report" From Application No. 22838451.7, Dated Apr. 3, 2025, pp. 9.

* cited by examiner

PROBE DEVICES WITH TEMPERATURE SENSORS AND RELATED SYSTEMS AND METHODS

CROSS-REFERENCE TO RELATED APPLICATION(S)

This application claims the benefit under 35 U.S.C. § 119(e) to U.S. Provisional Application 63/219,558, filed Jul. 8, 2021 and entitled "Probe Devices with Temperature Sensors and Related Systems and Methods," which is hereby incorporated herein by reference in its entirety.

FIELD

The various embodiments herein relate to probes for treatment of patients, including neural and spinal probes, and further including thin film probes. The neural probes can include electrode arrays, cortical and/or depth probes, and related systems and methods for detection, stimulation, and/or ablation. The spinal probes can include stimulation devices for stimulating the spinal cord and/or peripheral nerves and related systems and methods.

BACKGROUND

Certain known neural and spinal probes and related devices utilize thin film, flexible printed circuits, offering thinner and more flexible products compared to current electrodes. The use of flexible printed circuits may also allow for increased product consistency and decreased production delays.

Certain probes can include a temperature sensor therein. But it is difficult to incorporate a temperature sensor into a probe due to the small profile of certain probes.

There is a need in the art for improved probes, including probes having thin film components and/or probes having a temperature sensor, and related devices and technologies.

BRIEF SUMMARY

Discussed herein are various probe devices having at least one temperature sensor associated with an electrode contact, and various systems and methods of making and use the probe devices for neural or spinal stimulation, recording, or ablation.

In Example 1, an electrode device comprises an elongate tubular body and a thin film body disposed around the elongate tubular body. Further, the thin film body comprises a first insulation layer, at least one contact disposed on a first side of the first insulation layer, at least one via defined within the at least one contact and the first insulation layer, a contact trace electrically coupled to the at least one via, the contact trace disposed on a second side of the first insulation layer, a temperature sensor disposed adjacent to the at least one contact, and a sensor trace electrically coupled to the temperature sensor.

Example 2 relates to the electrode device according to Example 1, wherein the electrode device is a detection, stimulation, and ablation electrode device.

Example 3 relates to the electrode device according to Example 1, wherein the electrode device is a neural electrode device or a spinal electrode device.

Example 4 relates to the electrode device according to Example 1, wherein the temperature sensor is a thermistor.

Example 5 relates to the electrode device according to Example 1, further comprising a second insulation layer disposed on a second side of the first insulation layer.

Example 6 relates to the electrode device according to Example 5, wherein the contact trace, the temperature sensor, and the sensor trace are disposed between the first and second insulation layers.

Example 7 relates to the electrode device according to Example 1, wherein the contact trace extends to a proximal end of the thin film body.

Example 8 relates to the electrode device according to Example 1, wherein the thin film body is wrapped around the elongate tubular body in a spiral configuration.

In Example 9, an electrode device comprises an elongate lead body, a thin film pad disposed at a distal end of the elongate lead body, a plurality of electrode contacts disposed on the thin film pad, and at least one temperature sensor disposed in the thin film pad.

Example 10 relates to the electrode device according to Example 9, wherein the electrode device is a detection, stimulation, or ablation electrode device.

Example 11 relates to the electrode device according to Example 9, wherein the electrode device is a neural electrode device or a spinal electrode device.

Example 12 relates to the electrode device according to Example 9, wherein the temperature sensor is a thermistor.

Example 13 relates to the electrode device according to Example 9, wherein the temperature sensor is a thermocouple.

Example 14 relates to the electrode device according to Example 9, wherein the thin film pad comprises a first insulation layer, wherein the plurality of electrode contacts are disposed on a first side of the first insulation layer, a second insulation layer disposed on a second side of the first insulation layer, at least one via defined within each of the plurality of electrode contacts and the first insulation layer, and a contact trace electrically coupled to the at least one via, the contact trace disposed between the first and second insulation layers.

Example 15 relates to the electrode device according to Example 14, wherein the thin film pad further comprises a sensor trace electrically coupled to the temperature sensor.

In Example 16, an electrode device comprises an elongate tubular body and a thin film body disposed around the elongate tubular body. Further, the thin film body comprises a first insulation layer, at least one contact disposed on a first side of the first insulation layer, a second insulation layer disposed on a second side of the first insulation layer, at least one via defined within the at least one contact and the first insulation layer, a contact trace electrically coupled to the at least one via, the contact trace disposed between the first and second insulation layers, a temperature sensor disposed adjacent to the at least one contact, wherein the temperature sensor is disposed between the first and second insulation layers, and a sensor trace electrically coupled to the temperature sensor, wherein the sensor trace is disposed between the first and second insulation layers.

Example 17 relates to the electrode device according to Example 16, wherein the contact trace extends to a proximal end of the thin film body.

Example 18 relates to the electrode device according to Example 16, wherein the sensor trace extends to a proximal end of the thin film body.

Example 19 relates to the electrode device according to Example 16, wherein the thin film body is wrapped around the elongate tubular body in a spiral configuration.

While multiple embodiments are disclosed, still other embodiments will become apparent to those skilled in the art from the following detailed description, which shows and describes illustrative embodiments. As will be realized, the various implementations are capable of modifications in various obvious aspects, all without departing from the spirit and scope thereof. Accordingly, the drawings and detailed description are to be regarded as illustrative in nature and not restrictive.

DETAILED DESCRIPTION

The various embodiments herein relate to neural or spinal probes, including detection, stimulation, and ablation probes and devices, having at least one temperature sensor disposed therein, and further including related components, devices, and technologies. Further, certain implementations relate to a neural or spinal probe that is a multifunctional probe capable of recording electrical activity, ablation, and acute or chronic stimulation and has at least one temperature sensor. The various electrode embodiments herein can be used independently or with other diagnostic systems such as MRI or the like. Further, the electrode implementations disclosed or contemplated herein can be placed percutaneously or via any minimally invasive surgical approach. The electrical contacts on any of the embodiments can have various shapes and/or sizes to accommodate a patient's specific anatomy. Further, any implementation herein can have any known pharmacologic eluting agent and/or the structure/ability to deliver such pharmacologic agents.

Figure 1A:
FIG. 1A is a top view of a cortical electrode device.
Figure 1B:
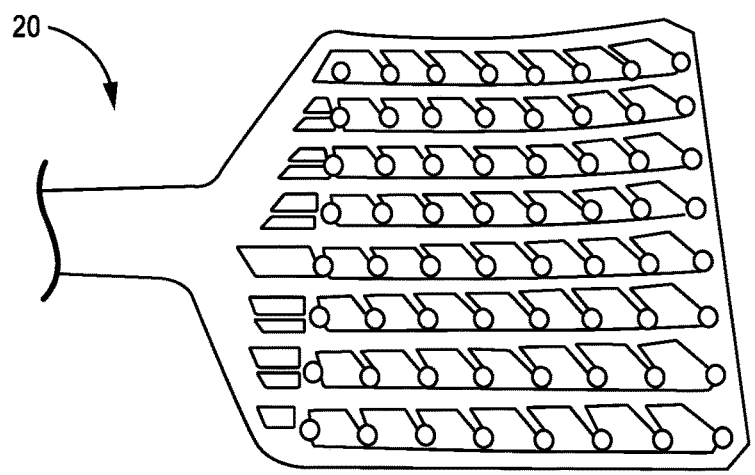
FIG. 1B is a perspective view of a portion of a cortical electrode device with a contact array pad.
Figure 1C:
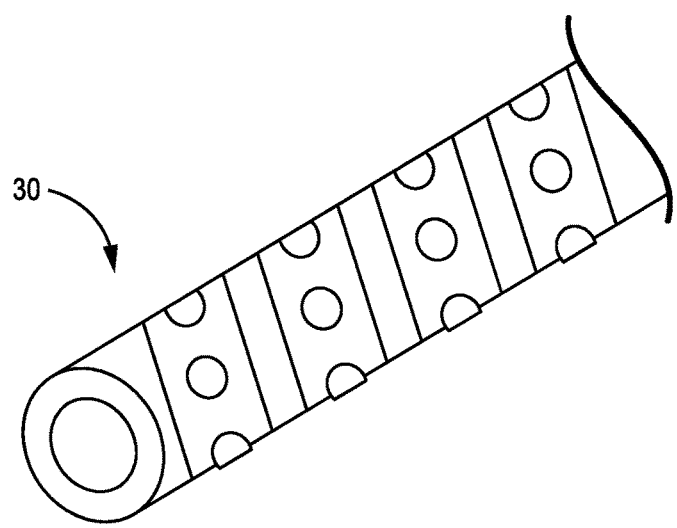
FIG. 1C is a perspective view of a portion of a depth electrode device 30.

As shown in FIGS. 1A-1C, the exemplary types of thin film probes that could incorporate the various temperature sensor embodiments disclosed or contemplated herein can include, but are not limited to, a cortical electrode device 10 as shown in FIG. 1A, a cortical electrode device with a contact array pad 20 as shown in FIG. 1B, a depth electrode device 30 as shown in FIG. 1C, or any other known neural probes. Further, it is understood that any known thin film spinal probe can also incorporate any temperature sensor embodiment disclosed or contemplated herein. In addition to any of the temperature sensors disclosed or contemplated herein, any of these neural or spinal probes can also have any other known features or structures of known neural or spinal probes.

For purposes of this application, any of the various device embodiments herein can be referred to interchangeably as a "probe," "probe device," "electrode," or "electrode device." Any of these terms can be used to describe any neural or spinal electrode device that can be used for recording, ablation, and/or stimulation.

Figure 2A:
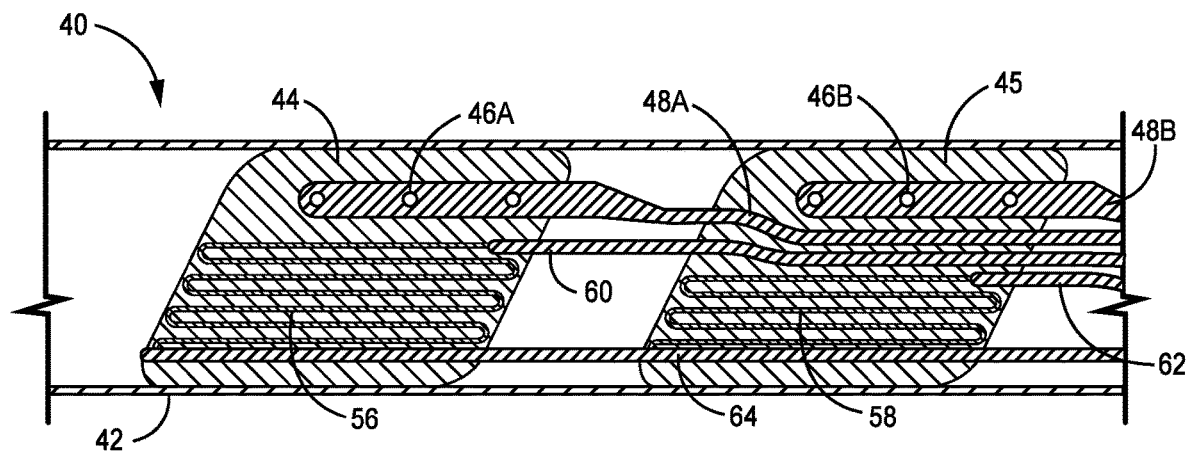
FIG. 2A is a schematic top view of a portion of a thin film probe body prior to assembly, according to one embodiment.
Figure 2B:
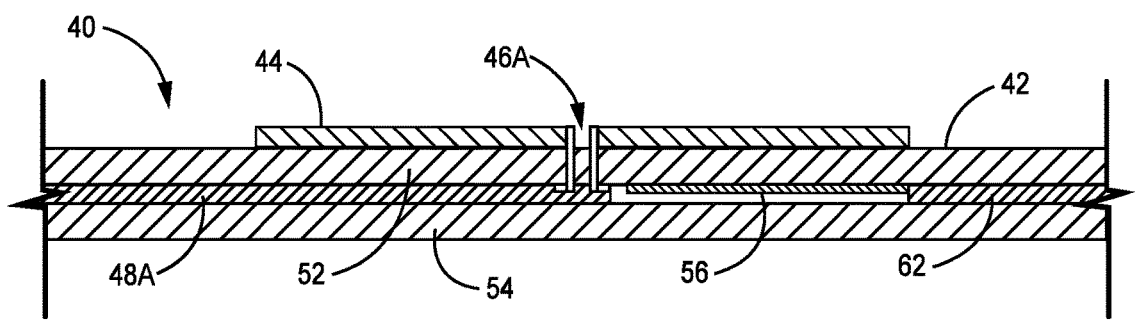
FIG. 2B is a cross-sectional side view of a portion of the thin film probe body of FIG. 2A, according to one embodiment.

An enlarged depiction of a portion of an exemplary depth electrode probe 40 having temperature sensors 56, 58 is depicted in FIGS. 2A and 2B, according to one embodiment. In this exemplary implementation, the probe 40 is an sEEG electrode depicted in its flat configuration before final assembly. FIG. 2A is a top view of a portion of the probe 40, while FIG. 2B is a cross-sectional side view of the probe 40. In the specific exemplary implementation as shown, the unassembled probe 40 has a flat device body 42 with contacts 44, 45 disposed on one side of the device body 42, with FIG. 2A depicting both contacts 44, 45, while FIG. 2B depicts only one contact 44. While two exemplary contacts 44, 45 are shown, it is understood that the FIGS. 2A and 2B depict only a portion of the length of the body 42 and that the device 40 can have multiple contacts. In this embodiment, the contacts 44, 45 are thin conductive films 44, 45 that can be made out of platinum, gold, platinum-iridium, titanium, and/or any other known metal with similar electrical and mechanical properties. During assembly, the flat body 42 as shown in FIGS. 2A and 2B is wrapped around a core body (not shown), such as in a spiral configuration similar to that shown in depth probe 30 in FIG. 1C, for example. While FIGS. 2A and 2B depict only top and cross-sectional views of the flat body 42 and thus don't show the spiral (or helical) configuration itself, the spiral configuration extends along at least some portion of the length of the core body (not shown). Once the circuit 40 is wrapped around the core body (not shown) to form the tubular device (such as depth probe 30), the contacts 44, 45 are disposed around the outer surface of the device.

In accordance with one embodiment, all of the contacts on the device 40—including contacts 44, 45—have a rhombus shape as shown in FIG. 2A. In such embodiments, when the flat thin-film device body 42 is wrapped around the core body (not shown) in a helical configuration, each rhombus-shaped contact is formed into a cylindrical shape that extends around the circumference of the core body. As such, the final device has two or more separate contacts, each of which extends almost entirely around the circumference of the core body in a cylindrical shape. More specifically, in certain embodiments, each contact (such as contacts 44, 45) extend around the circumference of the core body such that each end of the contact is separated by a small slit therebetween.

Continuing with FIGS. 2A and 2B, each of the contacts 44, 45 has a number of electrical couplers (or "vias") 46A, 46B positioned therethrough such that each via 46A, 46B electrically couples the contact 44, 45 through which it is positioned to an elongate electrical component or "trace" 48A, 48B that extends from the vias 46A, 46B to the proximal end of the body 42. That is, as best shown in FIG. 2B (depicting exemplary contact 44), the trace 48A is disposed between a first insulation layer 52 and a second insulation layer 54, such that the via 46A is necessary to electrically couple the contact 44 disposed on the outer surface of the body 42 with the trace 48A disposed between the two insulation layers 52, 54. According to one embodiment, the insulation layers 52, 54 are made of polyimide, LCP, parylene, or any other known material with similar electrical and mechanical properties. Alternatively, the layers 52, 54 can be made of any known material for an insulation layer in a neural or spinal probe. Further, each coupled contact 46A, 46B and trace 48A, 48B is electrically isolated from every other contact 46A, 46B and trace 48A, 48B pair.

In this specific embodiment, the probe 40 has two temperature sensors 56, 58 as shown, with the first temperature sensor 56 disposed in proximity with the first contact 44 and the second temperature sensor 58 disposed in proximity with the second contact 45. Because of the different perspectives of the two figures (with FIG. 2A depicting both contacts 44, 45 while FIG. 2B depicts solely contact 44), both sensors 56, 58 are visible in FIG. 2A, but only the second sensor 56 is visible in FIG. 2B. Each of the temperature sensors 56, 58 is disposed between the first and second insulation layers 52, 54 and has an electrical connection or "trace" 60, 62 operably coupled to the sensors 56, 58, respectively, that extends from the sensors 56, 58 to the proximal end of the body 42. Further, one ground wire 64 is provided that is electrically coupled to both sensors 56, 58.

In the specific embodiment depicted herein, a temperature sensor (such as sensors 56, 58) is provided for each contact (such as contacts 44, 45) such that each sensor 56, 58 is disposed adjacent to its respective contact 44, 45. Alternatively, a single temperature sensor can be provided for every two contacts, or every three contacts, or any other number of contacts. In a further alternative, two temperature sensors can be provided for each contact, or three sensors for each contact, or any other number of sensors per contact. In yet another alternative, one or more temperature sensors can be disposed within a probe and not positioned in proximity with any contact. In other words, various device embodiments can have only one temperature sensor or any other number of temperature sensors that are disposed anywhere on the device in locations that are not related to the locations of the contacts.

According to the exemplary implementation as shown, each sensor 56, 58 is a thermistor 56, 58, which can calculate a temperature from the change of resistance in the thermistor 56, 58. As shown, according to certain embodiments, each thermistor 56, 58 is an elongate, thin member of a specific metal that extends in a winding or patterned fashion such that there are multiple parallel lengths of the elongate member positioned adjacent to each other. In one embodiment, each thermistor 56, 58 is made of a thin film of palladium. Alternatively, the thermistors 56, 58 can be made of platinum, titanium, or any other known metal with similar electrical properties that is appropriate for use in a thermistor. Alternatively, the temperature sensor is an integrated thermocouple. For example, in one specific embodiment, the integrated thermocouple can consist of adding a different metal (such as, for example, Constantan) to the copper trace. In this embodiment, the thermocouple is not configured in the patterned winding fashion of the thermistor (such as thermistors 56, 58) and instead is a single point for temperature sensing. In a further alternative, it is understood that other known temperature sensors can be used.

Various fabrication methods can be used to make the various device embodiments herein. One exemplary method is described in some detail as follows.

An initial step involves the first insulation layer (52 in FIG. 2B), which can be a sheet of material, or alternatively can be material casted (spin coated, drip coated, blade coated, or the like) or deposited (chemical or physical vapor deposition, or the like) on a carrier substrate. In certain embodiments, a conducting layer can be disposed or otherwise attached to either or both sides of the first insulation layer. The conducting layer(s) can be made of at least one of copper, titanium, gold, platinum, palladium, aluminum, or the like. Once the conducting layer(s) are in place, an etching method can be used to remove all excess conductive material and thereby define the conductive components that will remain (resulting in, for example, the traces 48A, 48B, 60, 62, and ground wire 64 as depicted in FIG. 2A). In one embodiment, a photolithography method can be used to define the conductive components intended to remain and any known etching method (including chemical, physical, wet or dry, for example) can be used to remove the excess material.

According to certain implementations, the one or more conductive layers discussed above can be added using a deposition method. The deposition method can be chemical or physical vapor deposition, electroplating, or any other known deposition method. Once the conducting layer has been added, the photolithography and/or etching techniques described above can be used.

In accordance with certain alternatives, instead of first adding one or more conductive layers, photolithography techniques can be used directly on the first insulation layer to define areas where conductive material is not needed. After the photolithography step, conductive material can be added via any known deposition method (such as those described above) such that conductive material is selectively added to the predetermined locations where the conductive components are desired (including, for example, the traces 48A, 48B, 60, 62, and ground wire 64 as depicted in FIG. 2A).

At this point, the temperature sensors (such as sensors 56, 58 discussed above, for example) are added. In one embodiment, photolithography techniques are used to define the pattern where the conductive material defining the temperature sensor is to be deposited. Next, the conductive material is deposited. In those implementations in which the sensor is a thermocouple, the photolithography and deposition can also be performed to define the traces required by the thermocouple. This step can result in the addition of the temperature sensors 56, 58 and, in certain embodiments, the ground wire 64.

Once the temperature sensors have been added, vias (such as via 46A in FIG. 2B, for example) can be formed by mechanical, laser or chemical drilling or etching of the first insulation layer 52, followed by electroplating or deposition of conductive material in the resulting opening such that the conductive material fills the opening or covers the sidewalls thereof.

Once the vias have been added as described, the contacts (such as contacts 44, 45 as discussed above, for example) can be added by adding another conductive layer on the side of the first conductive layer 52 opposite the side to which the traces were added as described above. The contacts can be defined by photolithography or other known shadow mask methods, followed by deposition of conductive material by known deposition methods.

According to certain alternative embodiments, the contacts can be added before the vias are formed.

At this point in accordance with some implementations, a second insulation layer (such as layer 54 in FIG. 2B) can be added on the same side of layer 52 as the traces 48A, 48B, 60, 62 such that the traces and temperature sensors (such as sensors 56, 58) are electrically insulated. In one embodiment, the layer can be added using a known adhesive or alternatively can be added using compression, thermocompression, physical contact, casting or deposition.

Once the various steps above are completed, the device body can be cut out of the substrate by any known cutting method, including any laser or mechanical cutting method.

Those skilled in the art will understand that the order of the various steps above can be altered without changing the spirit of the fabrication or the final result. Similarly, it is understood that additional steps can be employed to facilitate the fabrication or to incorporate other sections of the device not shown here (such as, for example, a connector).

Alternatively, any other known manufacturing methods can be used, including any such methods for the manufacturing of flexible circuits or MEMS devices.

Figure 3:
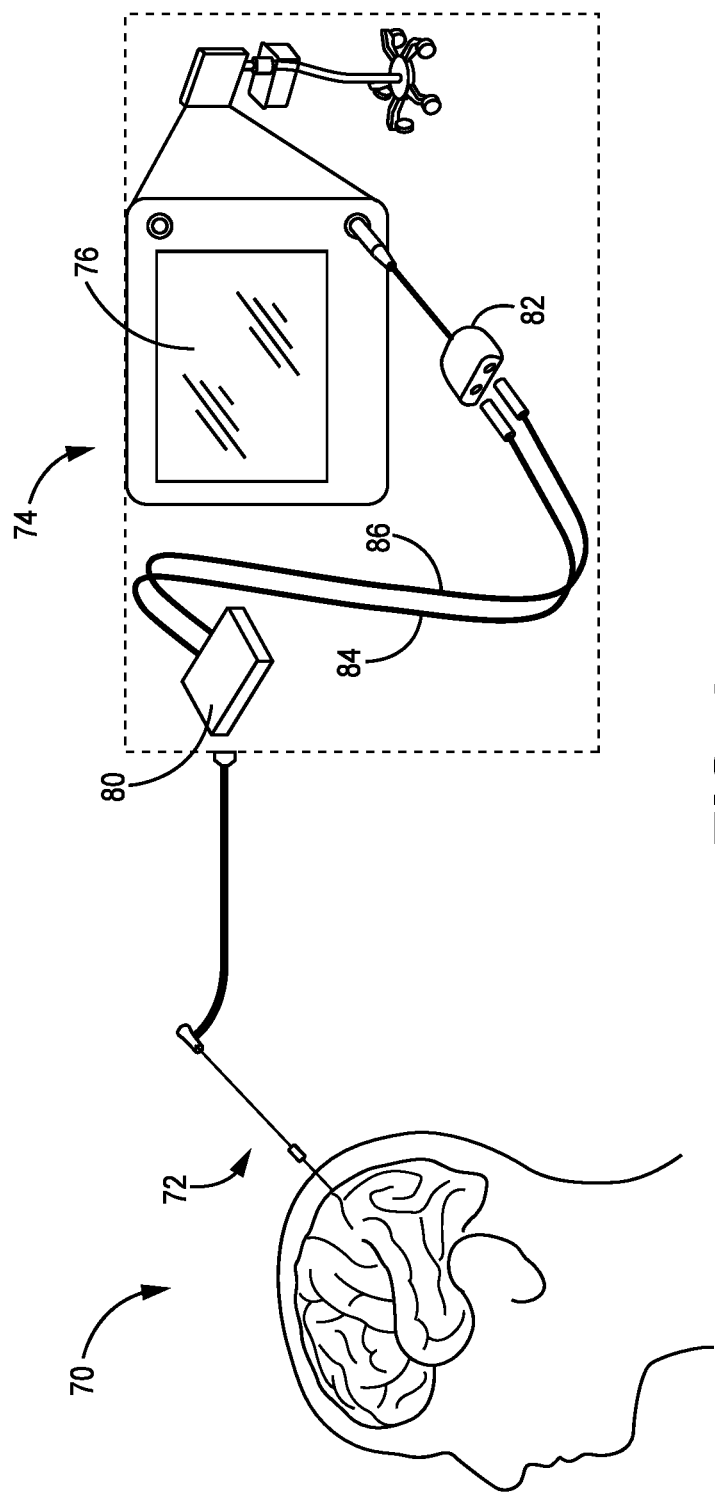
FIG. 3 is a schematic view of a system that includes an electrode device having a temperature sensor, according to one embodiment.

In various embodiments, any of the probe devices disclosed or contemplated herein can be incorporated into a probe system. For example, one implementation of system 70 with a probe device 72 having a temperature sensor is depicted in FIG. 3. The system 70 has a controller 74 coupled to the probe device 72. In certain embodiments, the controller 74 has a radiofrequency generator incorporated into the controller 74 that can provide ablation energy to the probe 72 and has an interactive interface 76 on the controller 74 that is accessible to a user during operation.

In certain implementations, the system 70 provides for the controller 74 to be coupled to the probe device (with temperature sensor) 72 in the following, non-limiting manner. The system 70 can have a connector box 80 to which the probe 72 is coupled and further can have a controller interface box 82 coupled to the controller 74, with the connector box 80 and the interface box 82 coupled via first and second cables 84, 86 as shown. Alternatively, any coupling mechanisms, cables, and features can be used to couple the controller 74 to the probe 72. Further, in some embodiments, the controller 74 can have software (or hardware) that allows for selection at the interface 76 of the desired contract and temperature sensor for the procedure.

In use, the various device embodiments disclosed or contemplated herein can be used to monitor the temperature of a neural or spinal probe during use. For example, in certain implementations in which the probe (such as probe 72 discussed above) is a stimulation or ablation probe, the temperature sensors can be used to track the temperature during stimulation or ablation. In further implementations, the temperature sensors can be used to identify the most effective temperature for stimulation or ablation (and thus the most effective level of stimulation or ablation to use). Known processes currently rely on an MRI to monitor or examine the effects of ablation after use of an ablation electrode. Using any one of the various implementations herein, the use of the MRI could be enhanced by the real-time knowledge of the temperature at the ablation site. That is, the combination of the temperature sensing and the MRI imaging after the fact would allow for a user (such as a surgeon) to be able to identify the optimal ablation temperature to achieve the optimal ablative effect on the tissue. In further alternatives, the temperature sensor could ultimately eliminate the need for the MRI imaging.

Although the various embodiments have been described with reference to preferred implementations, persons skilled in the art will recognize that changes may be made in form and detail without departing from the spirit and scope thereof.

What is claimed is:

1. An electrode device comprising:
   (a) an elongate tubular body;
   (b) a thin film body disposed around the elongate tubular body, the thin film body comprising:
      (i) a first insulation layer;
      (ii) at least one contact disposed on a first side of the first insulation layer;
      (iii) at least one via defined within the at least one contact and the first insulation layer;
      (iv) a contact trace electrically coupled to the at least one via, the contact trace disposed on a second side of the first insulation layer;
      (v) a second insulation layer disposed on a side of the contact trace opposite the first insulation layer such that the contact trace is disposed between the first and second insulation layers;
      (vi) a temperature sensor disposed between the first and second insulation layers and directly opposite to the at least one contact and
      (vii) a sensor trace electrically coupled to the temperature sensor.

2. The electrode device of claim 1, wherein the electrode device is a detection, stimulation, and ablation electrode device.

3. The electrode device of claim 1, wherein the electrode device is a neural electrode device or a spinal electrode device.

4. The electrode device of claim 1, wherein the temperature sensor is a thermistor.

5. The electrode device of claim 1, wherein the sensor trace is disposed between the first and second insulation layers.

6. The electrode device of claim 1, wherein the contact trace extends to a proximal end of the thin film body.

7. The electrode device of claim 1, wherein the thin film body is wrapped around the elongate tubular body in a spiral configuration.

8. The electrode device of claim 1, wherein thetemperature sensor comprises an elongate member comprising a plurality of parallel lengths disposed adjacent to each other.

9. An electrode device comprising:
   (a) an elongate lead body;
   (b) a thin film pad disposed at a distal end of the elongate lead body, the thin film pad comprising a first insulation layer;
   (c) a plurality of electrode contacts disposed on a first side of the first insulation layer; and
   (d) at least one temperature sensor disposed on a second side of the first insulation layer directly opposite one of the plurality of electrode contacts.

10. The electrode device of claim 9, wherein the electrode device is a detection, stimulation, or ablation electrode device.

11. The electrode device of claim 9, wherein the electrode device is a neural electrode device or a spinal electrode device.

12. The electrode device of claim 9, wherein the temperature sensor is a thermistor.

13. The electrode device of claim 9, wherein the temperature sensor is a thermocouple.

14. The electrode device of claim 9, wherein the thin film pad comprises:
   (a) a second insulation layer disposed on the second side of the first insulation layer;
   (b) at least one via defined within each of the plurality of electrode contacts and the first insulation layer; and
   (c) a contact trace electrically coupled to the at least one via, the contact trace disposed between the first and second insulation layers.

15. The electrode device of claim 14, wherein the thin film pad further comprises a sensor trace electrically coupled to the temperature sensor.

16. An electrode device comprising:
   (a) an elongate tubular body;
   (b) a thin film body disposed around the elongate tubular body, the thin film body comprising:
      (i) a first insulation layer;
      (ii) at least one contact disposed on a first side of the first insulation layer;

(iii) a second insulation layer disposed on a second side of the first insulation layer;
(iii) at least one via defined within the at least one contact and the first insulation layer;
(iv) a contact trace electrically coupled to the at least one via, the contact trace disposed between the first and second insulation layers;
(v) a temperature sensor disposed adjacent to the at least one contact such that the temperature sensor and the at least one contact are disposed at the same longitudinal and lateral position on the thin film body, wherein the temperature sensor is disposed between the first and second insulation layers; and
(vi) a sensor trace electrically coupled to the temperature sensor, wherein the sensor trace is disposed between the first and second insulation layers.

17. The electrode device of claim 16, wherein the contact trace extends to a proximal end of the thin film body.

18. The electrode device of claim 16, wherein the sensor trace extends to a proximal end of the thin film body.

* * * * *